United States Patent
Khan (10) Patent No.: US 10,701,755 B2
(45) Date of Patent: Jun. 30, 2020

(54) WIRELESS COMMUNICATIONS USING VIRTUALIZED BASE STATIONS NETWORK

(71) Applicant: Phazr, Inc., Allen, TX (US)

(72) Inventor: Farooq Khan, Allen, TX (US)

(73) Assignee: Phazr, Inc., Allen, TX (US)

(*) Notice: Subject to any disclaimer, the term of this patent is extended or adjusted under 35 U.S.C. 154(b) by 80 days.

(21) Appl. No.: 15/954,571

(22) Filed: Apr. 16, 2018

(65) Prior Publication Data

US 2019/0320487 A1 Oct. 17, 2019

(51) Int. Cl.
*H04W 36/06* (2009.01)
*H04W 36/36* (2009.01)
*H04W 76/27* (2018.01)
*H04B 7/06* (2006.01)
*G06F 9/455* (2018.01)
*H04B 7/0413* (2017.01)

(52) U.S. Cl.
CPC ........ *H04W 76/27* (2018.02); *G06F 9/45558* (2013.01); *H04B 7/0413* (2013.01); *H04B 7/0617* (2013.01); *G06F 2009/45595* (2013.01)

(58) Field of Classification Search
None
See application file for complete search history.

(56) References Cited

U.S. PATENT DOCUMENTS

| 8,711,803 B1* | 4/2014 | Wang | H04W 36/023 370/206 |
|---|---|---|---|
| 2005/0088992 A1* | 4/2005 | Bolin | H04W 88/085 370/329 |
| 2013/0281049 A1* | 10/2013 | Lee | H04W 24/00 455/405 |
| 2014/0254565 A1* | 9/2014 | Pitchaiah | H04L 5/22 370/336 |
| 2016/0085594 A1* | 3/2016 | Wang | H04L 67/18 709/226 |
| 2016/0212620 A1* | 7/2016 | Paczkowski | H04W 12/08 |
| 2018/0060105 A1* | 3/2018 | Shimizu | H04W 88/085 |
| 2018/0183717 A1* | 6/2018 | Panchal | H04L 47/2475 |
| 2018/0270724 A1* | 9/2018 | Horn | H04W 8/08 |
| 2019/0104442 A1* | 4/2019 | Witzel | G06F 9/45558 |
| 2019/0132897 A1* | 5/2019 | Pradas | H04W 76/15 |
| 2019/0182290 A1* | 6/2019 | Haddad | H04L 61/6054 |
| 2019/0261413 A1* | 8/2019 | Fodor | H04W 16/14 |
| 2019/0272187 A1* | 9/2019 | Smith | G06F 9/455 |

* cited by examiner

*Primary Examiner* — Duc T Duong
(74) *Attorney, Agent, or Firm* — Michael A. Rahman (57) ABSTRACT

A method for wireless communication includes transmitting at least first and second uplink signals by a UE to first and second virtualized radio units, respectively. The first and second uplink signals are processed by one or more virtual machines shared by both the first and second radio units. The UE switches connection from the first virtualized radio unit to the second virtualized radio unit without a transfer of context information from the first virtualized radio unit to the second virtualized radio unit. A first virtual machine implements at least one of a lower physical layer (PHY-Low), an analog-to-digital converter (ADC), a digital-to-analog converter (DAC), and a radio frequency (RF) transceiver. A second virtual machine implements at least one of a Radio Link Control (RLC) layer, a Medium Access Control (MAC) layer, and a higher physical (PHY-high) layer.

32 Claims, 11 Drawing Sheets

WIRELESS COMMUNICATIONS USING VIRTUALIZED BASE STATIONS NETWORK

BACKGROUND

The invention relates to communications, and in particular relates to wireless communications using virtualized wireless base stations.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems, whereas the 4G LTE systems provide wide area long-range connectivity both outdoors and indoors using dedicated infrastructure such as cell towers and backhaul to connect to the Internet.

As more people connect to the Internet, increasingly chat with friends and family, watch and upload videos, listen to streamed music, and indulge in virtual or augmented reality, data traffic continues to grow exponentially. In order to address the continuously growing wireless capacity challenge, the next generation of LAN and WAN systems are relying on higher frequencies referred to as millimeter waves in addition to currently used frequency bands below 7 GHz. The next generation of wireless WAN standard referred to as 5G New Radio (NR) is under development in the Third Generation Partnership Project (3GPP). The 3GPP NR standard supports both sub-7 GHz frequencies as well as millimeter wave bands above 24 GHz. In 3GPP standard, frequency range 1 (FR1) covers frequencies in the 0.4 GHz-6 GHz range. Frequency range 2 (FR2) covers frequencies in the 24.25 GHz-52.6 GHz range.

In addition to serving mobile, wearable and IoT (Internet of Things) devices, the next generation of wireless cellular systems using millimeter wave and sub-7 GHz spectrum are expected to provide high-speed (Gigabits per second) links to fixed wireless broadband routers installed in homes and commercial buildings.

Figure 1A:
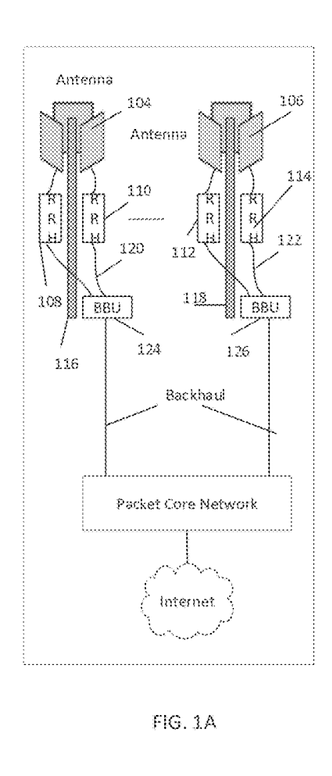
FIGS. 1A-C illustrates macro cellular network, C-RAN and Cloud RAN architectures.
Figure 1B:
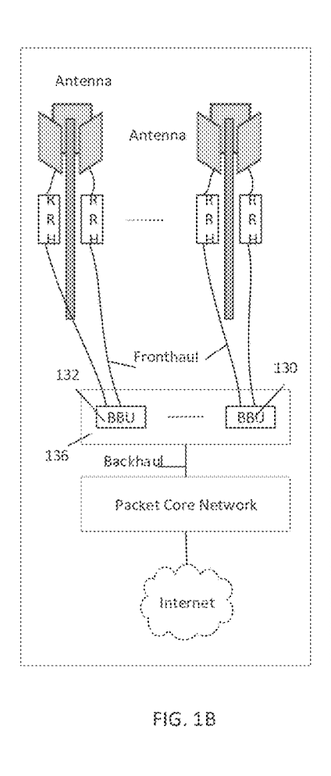
Figure 1C:
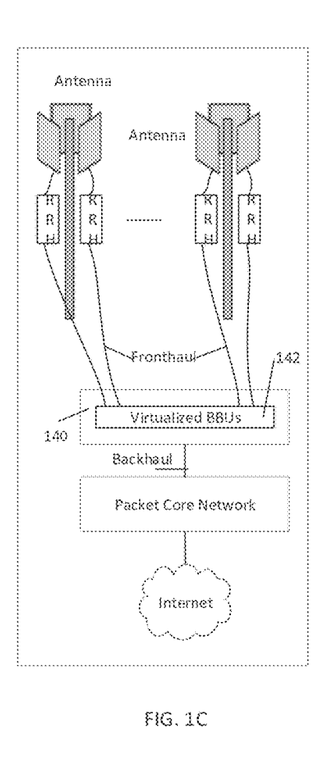

In a traditional macro cellular network shown in FIG. 1A, antennas 104 and 106 and remote radio heads (RRH) 108, 110, 112 and 114 are mounted at the top of tower 116 and 118, with fibers 120 and 122 linking them to baseband units (BBUs) 124 and 126 situated at the base of the tower on the cell site. In centralized RAN or C-RAN architecture depicted in FIG. 1B, baseband units (BBUs) 130 and 132 are pulled off each site and centralized in a BBU pool, or C-RAN hub 136. The C-RAN hub 136 itself can serve a large number of cell sites and replaces the traditional BBUs located at each site. In Cloud RAN architecture illustrated in FIG. 1C, a centralized baseband unit (BBU) processing 140 is further virtualized, enabling high utilization resource pooling with each virtual BBU 142 servicing multiple cells. A major drawback of C-RAN and Cloud RAN architectures is that they require extremely large bandwidth to carry the digitized baseband data on the so-called front-haul which is not only expensive but also adds latency negatively affecting the network capacity and performance.

SUMMARY

Various aspects of the present disclosure are directed to wireless communication between a user equipment (UE) and a virtualized radio base station. In one aspect of the present disclosure, a method for wireless communication includes transmitting at least first and second uplink signals by a UE to first and second virtualized radio units, respectively. The first and second uplink signals are processed by one or more virtual machines shared by both the first and second radio units. The UE switches connection from the first virtualized radio unit to the second virtualized radio unit without a transfer of context information from the first virtualized radio unit to the second virtualized radio unit. A first virtual machine implements at least one of a lower physical layer (PHY-Low), an analog-to-digital converter (ADC), a digital-to-analog converter (DAC), and a radio frequency (RF) transceiver. A second virtual machine implements at least one of a Radio Link Control (RLC) layer, a Medium Access Control (MAC) layer, and a higher physical (PHY-high) layer. A third virtual machine implements at least one of a Packet Data Convergence Protocol (PDCP) layer, a Service Data Adaptation Protocol (SDAP) layer, and a Radio Resource Control (RRC) layer.

In an additional aspect of the disclosure, a method for wireless communication includes transmitting a first uplink signal by a UE to a first virtualized radio unit during a first time interval, wherein the UE maintains connection with the first radio unit during the first time interval. The method also includes switching connection by the UE during a second time interval from the first virtualized radio unit to a second virtualized radio unit. The method also includes transmitting a second uplink signal by the UE to the second virtualized radio unit during the second time interval. The first and second downlink signals are processed by one or more virtual machines shared by both the first and second radio units. The UE switches connection from the first virtualized radio unit to the second virtualized radio unit without a transfer of context information from the first virtualized radio unit to the second virtualized radio unit.

In an additional aspect of the disclosure, a method for wireless communication includes receiving a first downlink signal at a user equipment (UE) during a first time interval, wherein the first downlink signal is transmitted by a first virtualized radio unit. The method also includes receiving a second downlink signal at the UE during a second time interval, wherein the second downlink signal is transmitted by a second virtualized radio unit. The first and second downlink signals are processed prior to transmission by one or more virtual machines shared by both the first and second radio units.

In an additional aspect of the disclosure, a method for wireless communication includes receiving a first downlink signal at a user equipment (UE) when the UE is at a first location, wherein the first downlink signal is transmitted by a first virtualized radio unit. The method also includes moving by the UE from the first location to a second location and switching connection from the first virtualized radio unit to a second virtualized radio unit. The method also includes receiving a second downlink signal at the UE, wherein the second downlink signal is transmitted by the second virtualized radio unit. The first and second downlink signals are processed prior to transmission by one or more virtual machines shared by both the first and second radio units.

DETAILED DESCRIPTION

The techniques described herein may be used for various wireless communication networks such as wireless LAN, fourth Generation (4G) LTE cellular mobile, Fifth Generation (5G) cellular mobile and other networks such as, for example, fixed wireless access (FWA) networks. The terms "network" and "system" are often used interchangeably.

Embodiments of the present disclosure which will be described below provide methods and systems for wireless communications using virtualized base stations.

Figure 2:
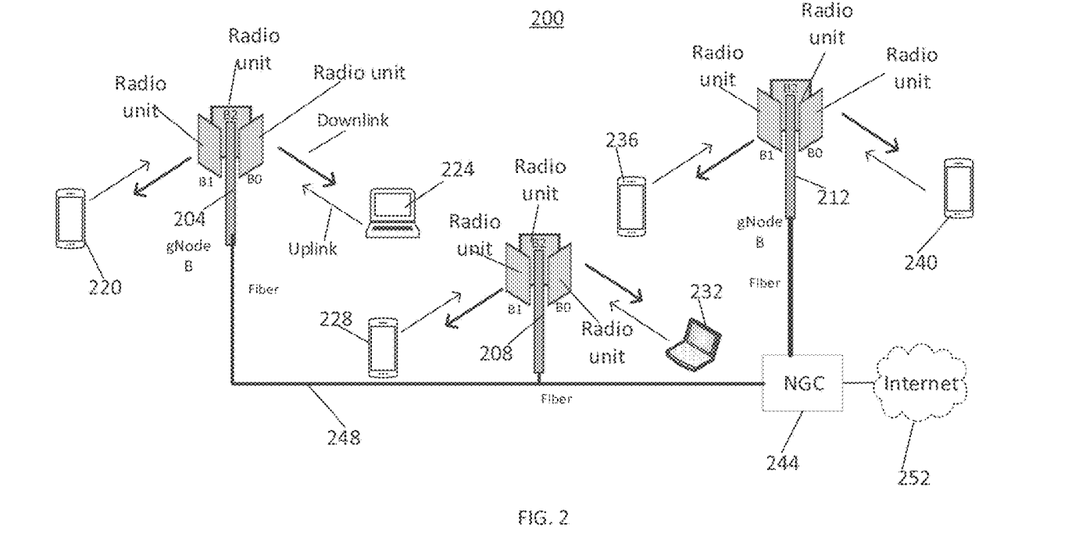
FIG. 2 illustrates wireless system in accordance with disclosed embodiments.

FIG. 2 illustrates a wireless communication network 200 (also referred to as a radio base stations network 200) according to an embodiment of the present disclosure. The wireless communication network 200 (or radio base stations network 200) uses both millimeter wave spectrum above 24 GHz and sub-7 GHz spectrum. The wireless communication network 200 may use millimeter wave spectrum above 24 GHz for both uplink or downlink, sub-7 GHz spectrum for both uplink or downlink or millimeter wave spectrum above 24 GHz for downlink and sub-7 GHz spectrum for uplink.

Referring to FIG. 2, the wireless network 200 (or radio base stations network 200) includes radio base station nodes 204, 208 and 212 (also referred to as gNode Bs) that communicate with communication devices 220, 224, 228, 232, 236 and 240. The communication devices 220, 224, 228, 232, 236 and 240 are also referred to as user equipments (UEs), and the terms "communication device" and "user equipment" (UE) are used interchangeably. The communication devices or UEs receive downlink signals from the radio base stations, and the communication devices or UEs transmit uplink signals to the radio base stations.

The radio base station nodes 204, 208 and 212 are virtualized and can provide 360 degrees coverage by using three radio units or sectors. For example, the radio base station node 204 includes radio units or sectors B0, B1, B2. The radio base station node 208 includes radio units or sectors B0, B1, B2. The radio base station node 212 includes radio units or sectors B0, B1, B2.

According to an embodiment of the present disclosure, each radio unit or sector may cover 120 degrees. Each radio unit or sector may be further divided into P sub-sectors with each sub-sector covering 120/P degrees. For example, for the case when a radio unit or sector is further divided into three sub-sectors, each sector provides 40 degrees coverage. The virtualized radio base station nodes gNode Bs 204, 208 and 212 are connected to a network 244 (e.g., Next Generation Core (NGC) network) using a communication link 248 (e.g., high-speed Fiber backhaul link). The network 244 may be connected to the Internet 252. The virtualized radio base station node 204 serves communication devices 220 and 224, the virtualized radio base station node 208 serves communication devices 228 and 232, and the virtualized radio base station node 212 serves communication devices 236 and 240. The communication devices may, for example, be smartphones, laptop computers, desktop computers, augmented reality/virtual reality (AR/VR) devices or any other communication devices.

Figure 3:
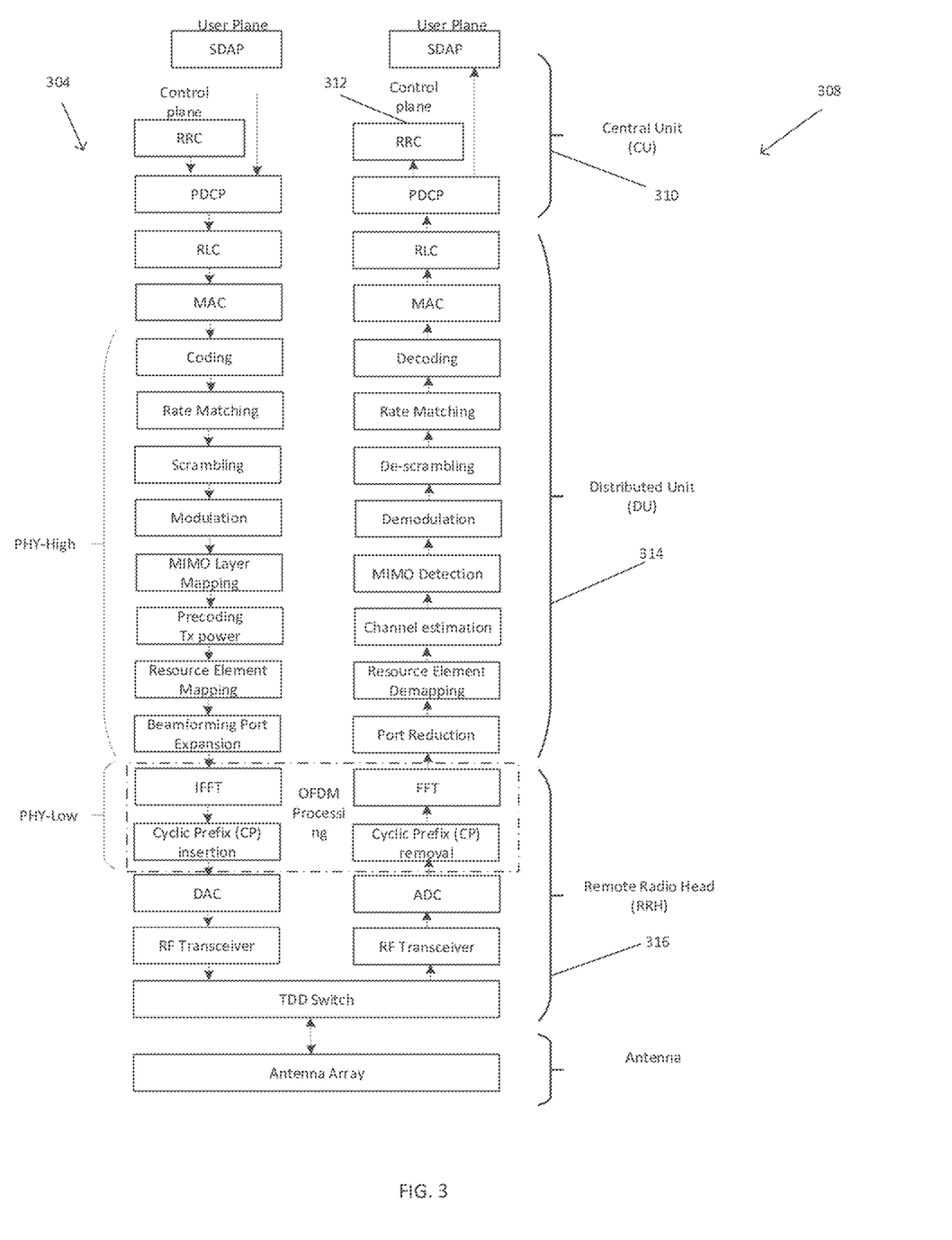
FIG. 3 is a block diagram of a virtualized base stations network according to some disclosed embodiments.

FIG. 3 is a block diagram of a virtualized base station node according to an embodiment of the present disclosure. In both transmit and receive chains 304 and 308, a central unit (CU) 310 includes a Packet Data Convergence Protocol (PDCP) layer, and a Service Data Adaptation Protocol (SDAP) layer. A control plane 312 includes a Radio Resource Control (RRC) on top of the PDCP layer in both the transmit and receive chains 304 and 308. A distributed unit (DU) 314 includes a Radio Link Control (RLC) layer, a Medium Access Control (MAC) layer, and higher physical (PHY-high) layer in both the transmit and receive chains 304 and 308. A remote radio head (RRH) 316 which is also referred to as remote radio unit (RRU) includes lower physical layer (PHY-Low) processing, analog/RF functions and antennas. The RRH 316 also includes, analog-to-digital converter (ADC), digital-to-analog converter (DAC), radio frequency (RF) transceiver, and an optional TDD (Time Division Duplexing) switch.

The main services and functions of the RRC sublayer include, broadcast of system information, paging, security functions including key management, QoS management functions, UE measurement reporting and control of the reporting, Detection of and recovery from radio link failure and NAS (Non-Access Stratum) message transfer to/from NAS from/to UE. RRC also controls the establishment, configuration, maintenance and release of Signaling Radio Bearers (SRBs) and Data Radio Bearers (DRBs); mobility functions including handover, context transfer, UE cell selection and reselection and control of cell selection and reselection. Moreover, RRC is in charge of establishment, maintenance and release of an RRC connection between the UE and NG-RAN including: addition, modification and release of carrier aggregation; addition, modification and release of Dual Connectivity in NR or between E-UTRA and NR.

The main services and functions of SDAP include mapping between a QoS flow and a data radio bearer and marking QoS flow ID (QFI) in both downlink and uplink packets. The main services and functions of the PDCP sublayer for the user plane include: sequence numbering, header compression, header decompression, reordering, duplicate detection, retransmission of PDCP SDUs (Service Data Units), ciphering, deciphering, integrity protection, PDCP SDU discard, duplication of PDCP PDUs (Protocol Data Units), PDCP re-establishment and PDCP data recovery for RLC AM (Acknowledged Mode).

The RLC sublayer supports three transmission modes: Transparent Mode (TM), Unacknowledged Mode (UM) and Acknowledged Mode (AM). The main services and functions of the RLC sublayer depend on the transmission mode and include: transfer of upper layer PDUs, sequence numbering independent of the one in PDCP (UM and AM), error Correction through ARQ (AM only), segmentation (AM and UM) and re-segmentation (AM only) of RLC SDUs, reassembly of SDU (AM and UM), duplicate detection (AM only), RLC SDU discard (AM and UM), RLC re-establishment and protocol error detection (AM only).

The main services and functions of the MAC sublayer include: mapping between logical channels and transport channels, multiplexing/demultiplexing of MAC SDUs into/ from transport blocks (TB) delivered to/from the physical layer, padding, scheduling information reporting, error correction through Hybrid ARQ, priority handling between UEs by means of dynamic scheduling and priority handling between logical channels.

The main services and functions the high physical layer (PHY-high) include: transport block CRC attachment, code block segmentation, code block CRC attachment, channel coding, physical-layer hybrid-ARQ processing, rate matching, bit-interleaving, modulation (QPSK, 16QAM, 64QAM and 256QAM etc.), layer mapping, pre-coding and mapping to assigned resources and antenna ports. The lower physical layer (PHY-Low) implements OFDM (Orthogonal Frequency Division Multiplexing) processing that includes FFT/IFFT (Fast Fourier Transform/Inverse Fast Fourier Transform) functions as well as addition and removal of cyclic prefix (CP).

Figures 4A, 4B:
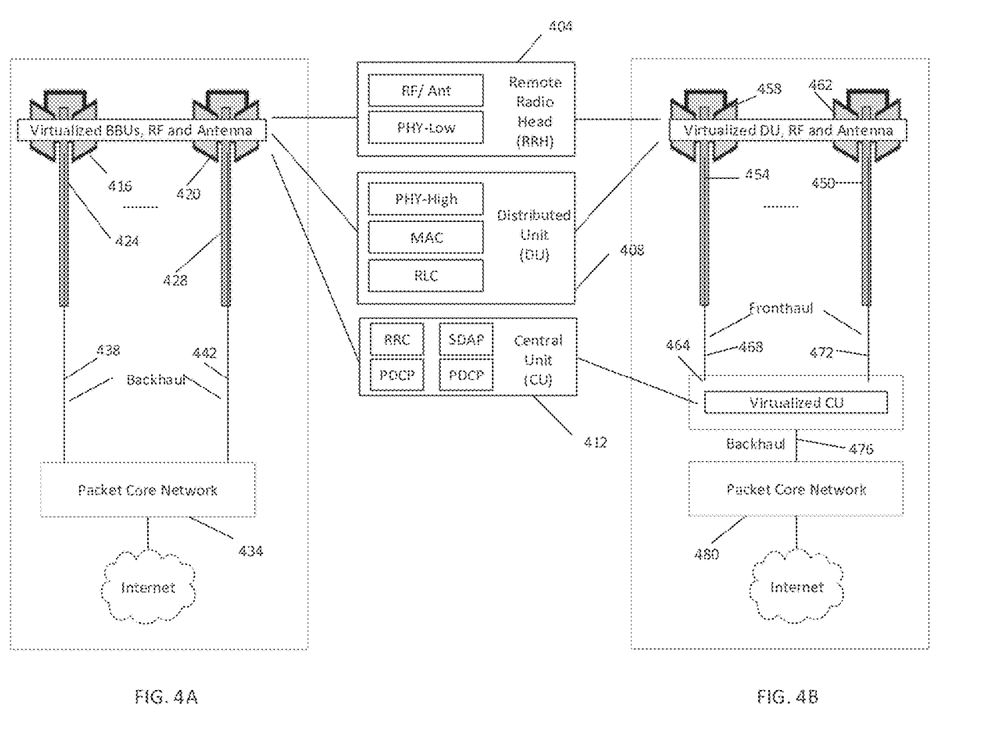
FIGS. 4A-B illustrate virtualized base stations network according to some disclosed embodiments.

FIGS. 4A-B illustrate cliff computing virtualized base stations network according to embodiments of the present disclosure. Referring to FIG. 4A, a base stations network includes radio base station nodes 424 and 428. Each radio base station nodes include a plurality of radio units. A remote radio head (RRH) 404, a distributed unit (DU) 408, and a central unit (CU) 412 are integrated into radio unit 416 of the base station node 424 and into the radio unit 420 of the base station node 428. The integration of the RRH 404, DU 408, CU 412 into the radio units is referred to as "cliff compute" architecture, and the resulting radio base station nodes 424 and 428 are referred to as cliff compute virtualized radio base station nodes 424 and 428.

The cliff compute virtualized radio base station nodes 424 and 428 communicate with a network 434 (e.g., Next Generation Packet Core (NGC) network) via backhaul links 438 and 442. Both DU 408 and CU 412 are virtualized in the cliff compute virtualized radio base station nodes 424 and 428. Thus, the base station nodes 424 and 428 share the DU 408 and CU 412.

In other embodiments, some functions of the RRH 404 can also be virtualized. In the architecture of FIG. 4B, the cliff compute virtualized radio base station nodes 450 and 454 implement the remote radio head (RRH) 404, the distributed unit (DU) 408, integrated with the radio units 458 and 462. The central unit (CU) 412 is virtualized and located at a central location 464 such as a central office or operator's data center. These cliff compute virtualized radio base station nodes 450 and 454 communicate with the central unit (CU) 412 via fronthaul links 468 and 472. These fronthaul links 468 and 472 between the distributed unit (DU) 408 and the central unit (CU) 412 do not require large bandwidth as they do not carry the digitized baseband data but rather carry standard Ethernet or IP packets. The virtualized central unit (CU) 412 communicates with a network 476 (e.g., Next Generation Packet Core (NGC) network) via backhaul links 480.

Figure 5:
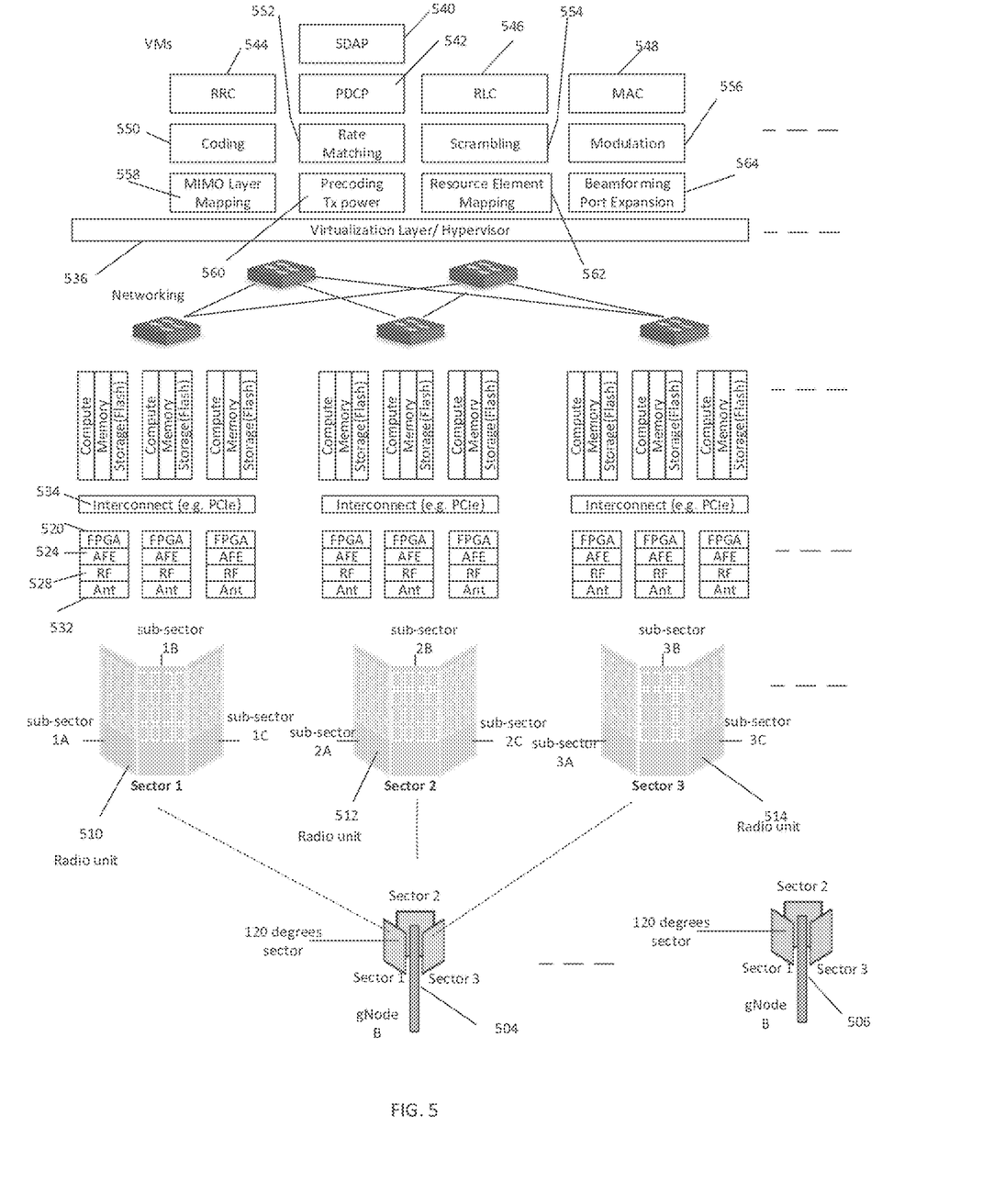
FIG. 5 illustrates virtualization of a radio base station implementing three sectors.

FIG. 5 illustrates virtualization of a radio base station node 504 implementing three radio units or sectors: radio unit or sector 510 (sector 1), radio unit or sector 512 (sector 2), and radio unit or sector 514 (sector 3). Each radio unit or sector is further divided into three sub-sectors. For example, sector 510 (sector 1) is divided into three sub-sectors: sub-sector 1A, sub-sector 1B and sub-sector 1C.

Each sub-sector (e.g., sub-sector 1A, sub-sector 1B) or a group of sub-sectors may include field-programmable gate arrays (FPGA), Analog Front-End (AFE), radio frequency (RF) transceivers, and antenna arrays for beamforming and MIMO (Multiple Input Multiple Output). For example, sub-sector 1A may include a field-programmable gate array (FPGA) 520, an Analog Front-End (AFE) 524, radio frequency (RF) transceivers 528, and antenna arrays 532 for beamforming and MIMO (Multiple Input Multiple Output).

The field-programmable gate array (FPGA) 520 performs functions such as OFDM processing using FFT (Fast Fourier Transform) and the IFFT (Inverse Fast Fourier Transform), addition and removal of Cyclic Prefix (CP). In other embodiments, FPGA can also implement functions such as modulation, channel coding and decoding using Low-Density Parity Check (LDPC) codes.

The Analog Front-End (AFE) 524 implements Digital Up Conversion (DUC) and Digital Down Conversion (DDC) that are DSP (Digital Signal Processing) sample rate conversion techniques used to increase or decrease the sampling rate of a signal respectively. The increased sampled rate digital signals are converted to analog domain by digital-to-analog converters (DAC) inside the AFE 524. The received analog signals are converted to digital signals by analog-to-digital converters (ADC) and sent to DDC block inside the AFE 524. The AFE 524 communicates with the FPGA 520 using a standardized serial interface such as JESD204B standard. In other embodiments, the functions of the AFE 524 can be implemented including the digital-to-analog converters (DAC) and analog-to-digital converters (ADC) can be integrated with the FPGA 520 in a single system-on-a-chip (SoC).

According to embodiments of the present disclosure, each sub-sector (e.g., sub-sector 1A, sub-sector 1B) or a group of sub-sectors also implement general-purpose compute such as, for example, processors using Intel x86 architecture, memory such as DDR4 SDRAM (double data rate fourth-generation synchronous dynamic random-access memory), storage such as Flash (solid-state non-volatile computer storage). These functions connect to the FPGA 520 via, for example, PCI Express (Peripheral Component Interconnect Express) 534 or other high-speed inter-connect. The communication between the sectors and sub-sectors is achieved via Ethernet or IP (Internet Protocol) switching.

According to embodiments of the present disclosure, a virtualization layer 536 separates the radio base stations physical hardware (antenna, RF, AFE, FPGA, processor, memory, and storage etc.) and software by emulating hardware using software. For example, a software called a hypervisor can be used to create the virtualization layer 536 that separates the physical resources from the virtual environments where the functions of a radio base station run. Hypervisors can sit on top of an operating system (Type 2) or be installed directly onto hardware (Type 1). Type 2 hypervisors support guest virtual machines by coordinating calls for CPU, memory, disk, network and other resources through the physical host's operating system. Examples of this type of hypervisor include VMware Fusion, Oracle Virtual Box, Oracle VM for x86, Solaris Zones, Parallels and VMware Workstation. In contrast, a Type 1 hypervisor (also called a bare metal hypervisor) is installed directly on physical host server hardware just like an operating system. Type 1 hypervisors run on dedicated hardware. Examples of this type of hypervisor include Oracle OVM for SPARC, ESXi, Hyper-V and KVM. Because the type 2 hypervisor has to go through the operating system and is managed by the OS, the type 2 hypervisor (and its virtual machines) will run less efficiently (slower) than a type 1 hypervisor.

Referring to FIG. 5, according to an embodiment of the present disclosure, central unit (CU) functions such as Service Data Adaptation Protocol (SDAP) 540, Packet Data Convergence Protocol (PDCP) 542, Radio Resource Control (RRC) 544, and the distributed unit (DU) functions such as Radio Link Control (RLC), Medium Access Control (MAC), and higher physical (PHY-high) layer are implemented as one or more virtual machines. In the example of FIG. 5, Service Data Adaptation Protocol (SDAP) 540, Packet Data Convergence Protocol (PDCP) 542, Radio Resource Control (RRC) 544, Radio Link Control (RLC) 546, Medium Access Control (MAC) 548 functions are implemented as virtual machines (VMs). Moreover, higher physical layer functions such as channel coding 550, rate matching 552, scrambling 554, modulation 556, MIMO layer mapping 558, precoding 560, resource element mapping 562 and beamforming port expansion 564 are implemented as virtual machines (VMs).

Figure 6:
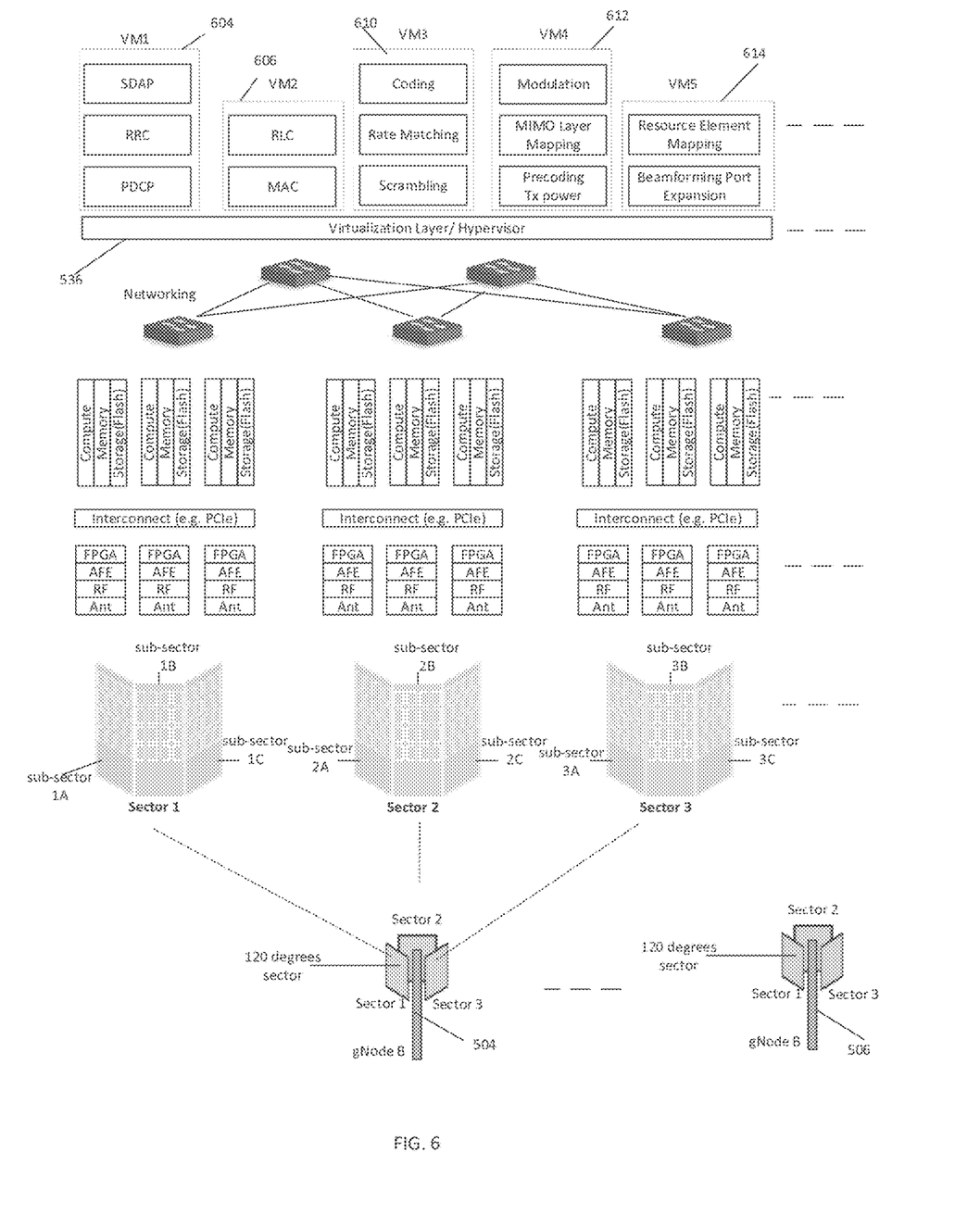
FIG. 6 illustrates virtualized base stations network according to some disclosed embodiments.

FIG. 6 illustrates virtualized base stations network according to some disclosed embodiments. The Service Data Adaptation Protocol (SDAP) 540, Packet Data Convergence Protocol (PDCP) 542 and Radio Resource Control (RRC) 544 functions are implemented as a single virtual machine 604 (VM1). Radio Link Control (RLC) 546 and Medium Access Control (MAC) 548 are implemented as another single virtual machine 606 (VM2). The higher physical (PHY-high) layer functions are implemented as three virtual machines. Virtual machine 610 (VM3) implements channel coding 550, rate matching 552 and scrambling 554. Virtual machine 612 (VM4) implements modulation 556, MIMO layer mapping 558, precoding 560. Finally, virtual machine 614 (VM5) implements resource element mapping 562 and beamforming port expansion 564. In other embodiments, same functions can be implemented in more than one virtual machine. For example, virtual machine 606 (VM2) implementing Radio Link Control (RLC) 546 and Medium Access Control (MAC) 548 can be replicated in multiple virtual machines.

According to other embodiments of the present disclosure, container technology is used for virtualization, in which a single operating system on a host can run many different applications. Virtual machines take up a lot of system resources because each virtual machine runs not just a full copy of an operating system, but a virtual copy of all the hardware that the operating system needs to run. This quickly adds up to a lot of RAM and CPU cycles. In contrast, all that a container requires is enough of an operating system, supporting programs and libraries, and system resources to run a specific program. This way, containers have a significant lesser overhead than virtual machines. Containers use a layer of software called container engine on top of the operating system. An example of container engine is Docker. Also, because of the sharing of the kernel with the host operating system, containers can start and stop extremely fast.

Figure 7:
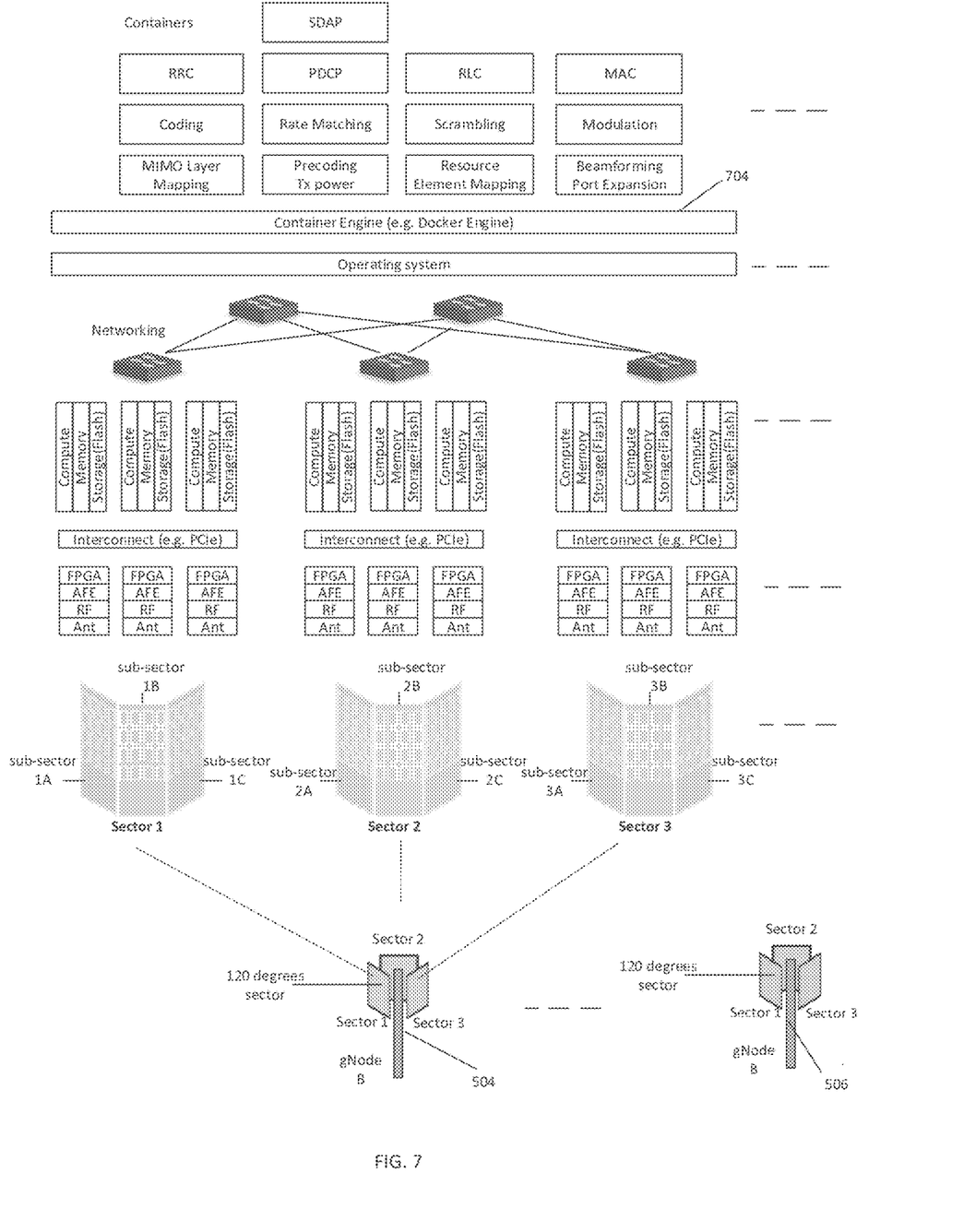
FIG. 7 illustrates virtualization of base stations using containers according to some disclosed embodiments.

FIG. 7 illustrates virtualization of base station nodes 504 and 506 using containers according to an embodiment of the present disclosure. The central unit (CU) functions such as Service Data Adaptation Protocol (SDAP), Packet Data Convergence Protocol (PDCP), Radio Resource Control (RRC), and the distributed unit (DU) functions such as Radio Link Control (RLC), Medium Access Control (MAC), and higher physical (PHY-high) layer functions are implemented as containers 704. There are many container formats available. Docker is an open-source container format that is supported by Google Kubernetes Engine. Each container shares the host OS kernel and, usually, the binaries and libraries, too.

Figure 8A:
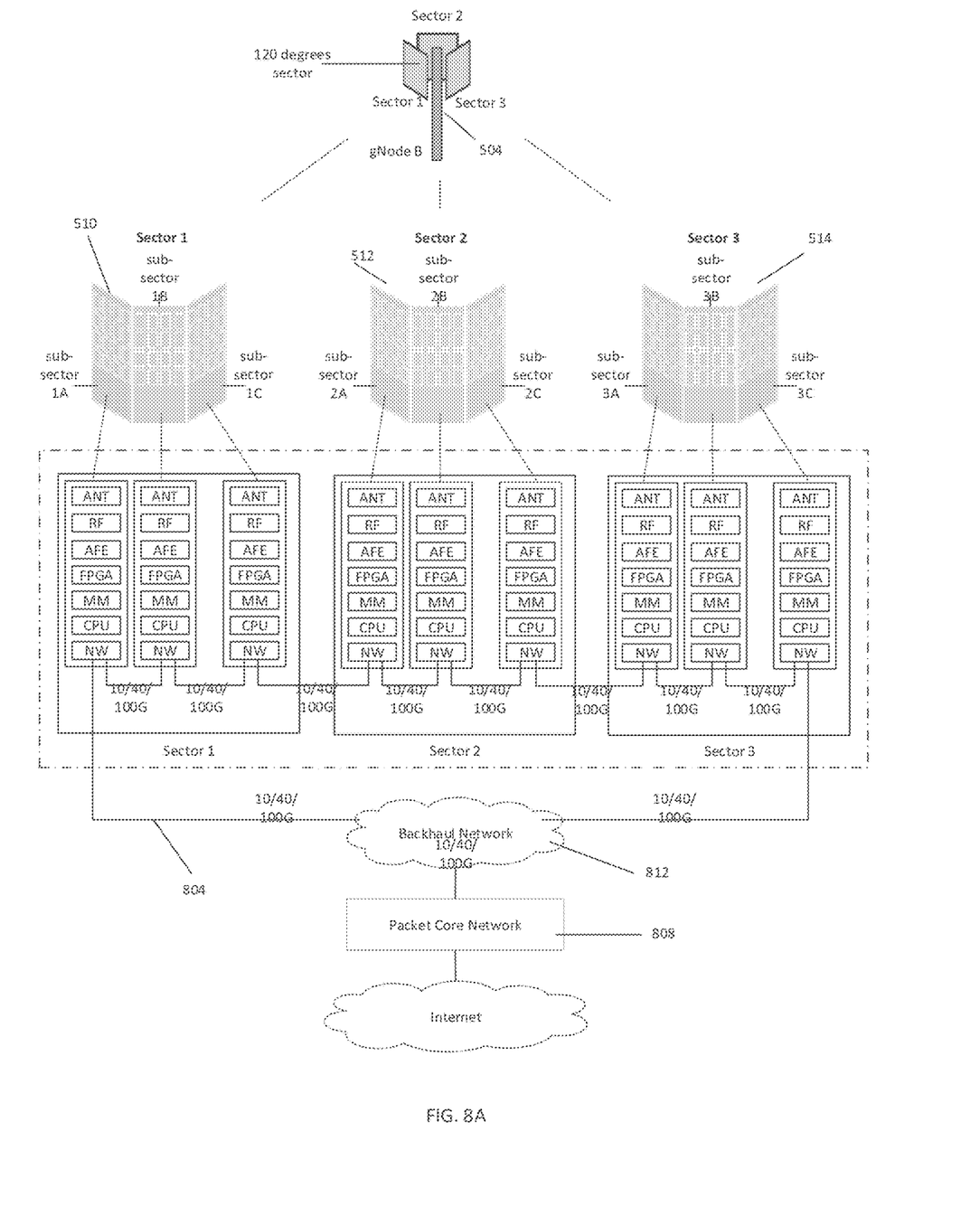
FIGS. 8A-B illustrate virtualization of sectors and sub-sectors of a radio base station according to some disclosed embodiments.
Figure 8B:
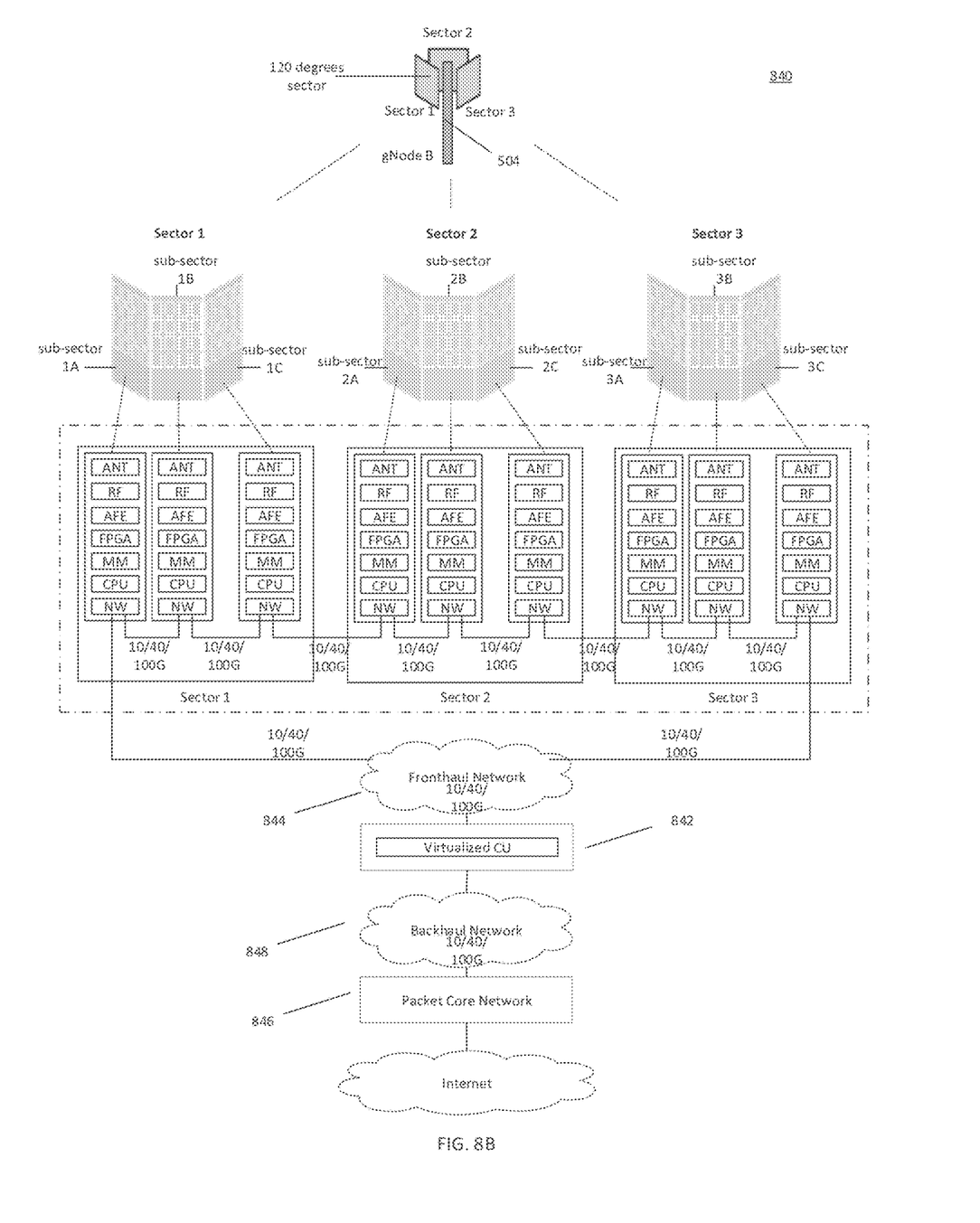

FIGS. 8A-B illustrate virtualization of radio units (sectors) and sub-sectors of a radio base station node 504 according to an embodiment of the present disclosure. Multiple radio units (radio unit 510, radio unit 512, and radio unit 514) and sub-sectors are wired together in sequence or in a ring using a link 804 (e.g., Ethernet or IP link). Referring to FIG. 8A, the remote radio head (RRH) 316, the distributed unit (DU) 314, and the central unit (CU) 310 are integrated with the radio units 510, 512, and 514 in cliff compute virtualized radio base station node 504. The RRH 316, the DU 314, and the CU 310 are described before and illustrated in FIG. 3.

The cliff compute virtualized radio base station node 504 communicates with a network 808 (e.g., Next Generation Packet Core (NGC) network) via a backhaul network 812. Both the DU 314 and the CU 310 are virtualized in the cliff compute virtualized radio base station nodes. In other embodiments, some functions of the RRH 404 can also be virtualized.

FIG. 8B illustrates a cliff compute virtualized radio base station network 840 where a virtualized central unit (CU) 842 is located at a central location such as a central office or operator's data center. The remote radio head (RRH) 316 and the distributed unit (DU) 314 are integrated with the antenna unit in the cliff compute virtualized radio base station node 504. The cliff compute virtualized radio base station node 504 communicates with the virtualized central unit (CU) 842 via a fronthaul network 844. These fronthaul links do not require large bandwidth as they carry standard Ethernet or IP packets. The virtualized central unit (CU) 842 communicates with a network 846 (e.g., Next Generation Packet Core (NGC) network) via standard Ethernet or IP backhaul network 848.

Figure 9A:
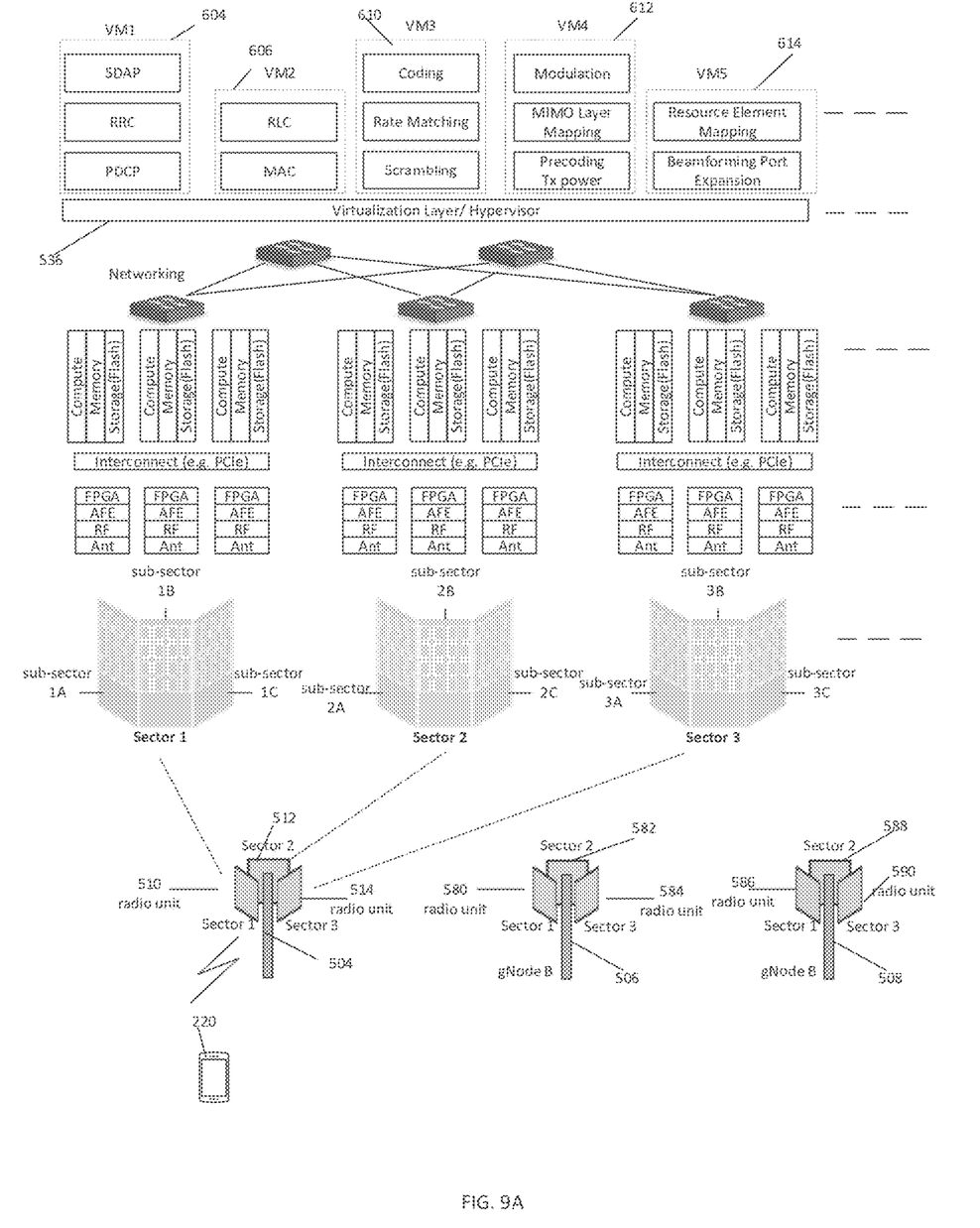
FIGS. 9A-B illustrate a wireless communication device connected to a virtualized base stations network.
Figure 9B:
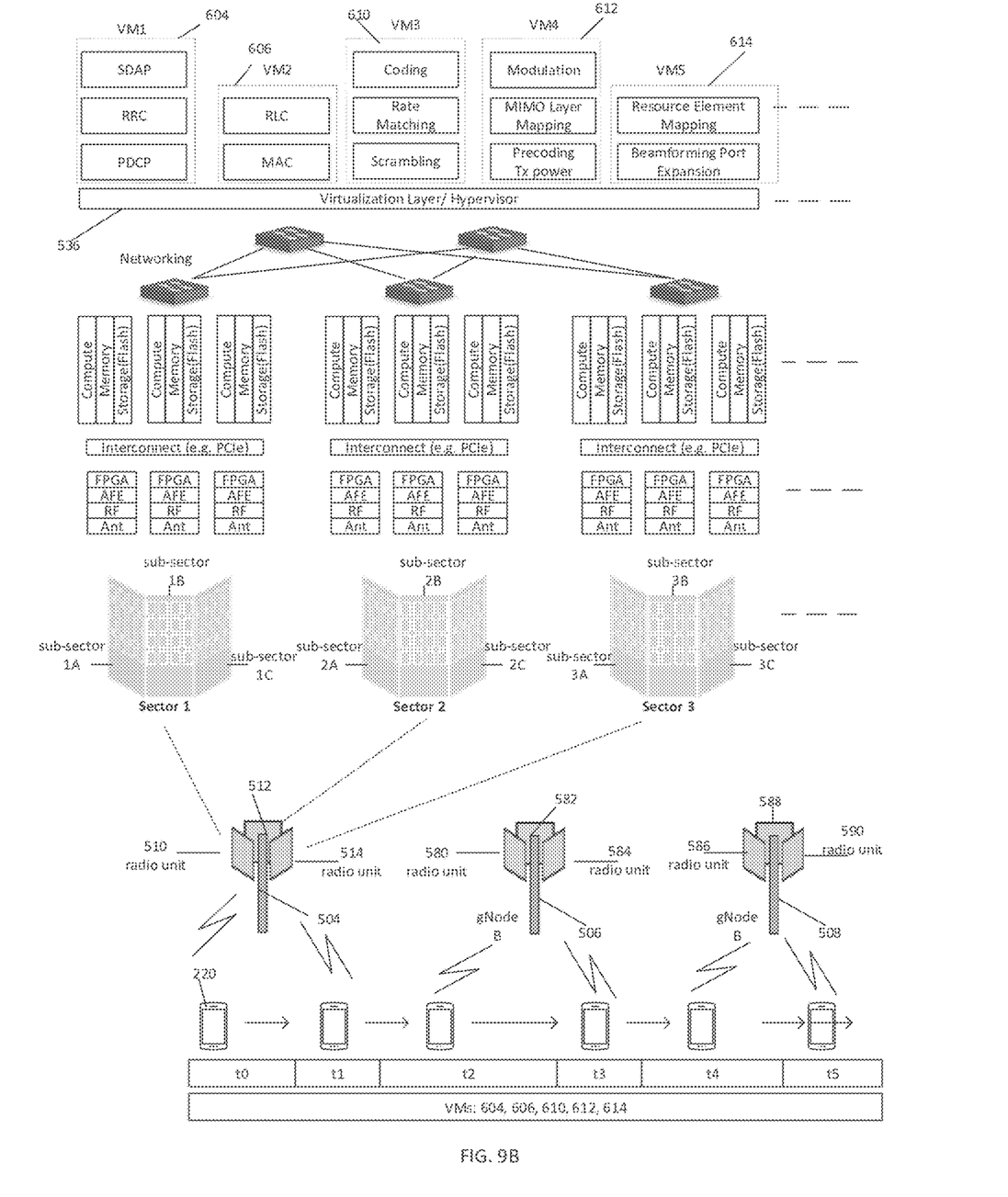

FIGS. 9A-B illustrate a wireless communication device 220 connected to the virtualized base stations network via radio unit 510 according to an embodiment of the present disclosure. The radio network functions for the wireless communication device 220 (or user equipment) are provided by virtual machines 604, 606, 610, 612 and 614. The virtual machine 604 (VM1) implements the Service Data Adaptation Protocol (SDAP) 540, Packet Data Convergence Protocol (PDCP) 542 and Radio Resource Control (RRC) 544 functions. The virtual machine 606 (VM2) implements the Radio Link Control (RLC) 546 and Medium Access Control (MAC) 548 functions. The higher physical (PHY-high) layer functions are implemented as three virtual machines. Virtual machine 610 (VM3) implements channel coding 550, rate matching 552 and scrambling 554. Virtual machine 612 (VM4) implements modulation 556, MIMO layer mapping 558, precoding 560. Finally, virtual machine 614 (VM5) implements resource element mapping 562 and beamforming port expansion 564. In other embodiments, same functions can be implemented in more than one virtual machine.

Referring to FIG. 9B, wireless communication device 220 (or user equipment) changes its physical connection from one radio unit to the other while receiving network services from the same virtual machines according to some embodiments of the present disclosure. The wireless communication device 220 may change its physical connection from one radio unit to the other to support mobility or due to changing channel conditions or loading in the network. For example, when a wireless communication device is moving away from a first radio unit and moving closer to a second radio unit due to mobility, its signal strength from the first radio unit will degrade due to increasing propagation distance between the communication device and the first radio unit while the signal strength will increase to the second radio unit due to decreasing propagation distance between the communication device and the second radio unit. Also, when a radio unit is heavily loaded with many communication devices connected to it, the throughput experienced by each communication device degrades. Under these circumstances, one or more communication devices may decide to connect to another radio unit for improved throughput performance.

In time period t0, wireless communication device 220 is physically connected to the radio unit 510 while being served by the virtual machines 604, 606, 610, 612 and 614. In time period t1, wireless communication device 220 is physically connected to the radio unit 512 while being served by the virtual machines 604, 606, 610, 612 and 614. In time period t2, wireless communication device 220 is physically connected to the radio unit 580 while being served by the virtual machines 604, 606, 610, 612 and 614. In time period t3, wireless communication device 220 is physically connected to the radio unit 582 while being served by the virtual machines 604, 606, 610, 612 and 614. In time period t4, wireless communication device 220 is physically connected to the radio unit 586 while being served by the virtual machines 604, 606, 610, 612 and 614. In time period t5, wireless communication device 220 is physically connected to the radio unit 588 while being served by the virtual machines 604, 606, 610, 612 and 614. The ability of a wireless communication device to change its physical connection to the radio unit while being served by the same virtual machine reduces network overhead and latency because there is no need to transfer communication device context information from one radio unit to the other when communication device changes its physical connection to a different radio unit. Since multiple radio units are served by the virtual machines, the communication device context information, which may be stored in at least one of the virtual machines, is available to the radio units. Thus, the communication device 220 can switch connection from a first radio unit to a second radio unit without a transfer of the context information from the first radio unit to the second radio unit. A communication device context information may, for example, include C-RNTI (Cell Radio Network Temporary Identifier) which is used to identify the UE during exchange of all information over the air. The C-RNTI is assigned during the setup of the RRC Connection. The context may also include states of different protocols such as Hybrid ARQ retransmission buffer state in the MAC, unacknowledged RLC PDU sequence numbers in RLC AM, header compression state in the PDCP, SDAP QoS flow ID (QFI) marking for a data radio bearer and RRC connection state.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A method for wireless communication, comprising:
transmitting a first uplink signal by a user equipment (UE) to a first virtualized radio unit;
transmitting a second uplink signal by the UE to a second virtualized radio unit,
wherein the first and second uplink signals are processed by one or more virtual machines shared by both the first and second radio units, and
wherein a first virtual machine implements at least one of a lower physical layer (PHY-Low), an analog-to-digital converter (ADC), a digital-to-analog converter (DAC), and a radio frequency (RF) transceiver, and
wherein a second virtual machine implements at least one of a Radio Link Control (RLC) layer, a Medium Access Control (MAC) layer, and a higher physical (PHY-high) layer
maintaining connection by the UE with the first virtual radio unit during a first time interval; and
switching connection by the UE during a second time interval from the first virtual radio unit to the second virtual radio unit.

2. The method of claim 1, wherein the UE switches connection from the first virtualized radio unit to the second virtualized radio unit without a transfer of context information from the first virtualized radio unit to the second virtualized radio unit.

3. The method of claim 1, wherein a third virtual machine implements at least one of a Packet Data Convergence Protocol (PDCP) layer, a Service Data Adaptation Protocol (SDAP) layer, and a Radio Resource Control (RRC) layer.

4. The method of claim 1, wherein the UE switches connection from the first virtual radio unit to the second virtual radio unit when the UE changes location due to mobility.

5. The method of claim 1, wherein the UE switches connection from the first virtual radio unit to the second virtual radio unit due to changing channel conditions or loading in the network.

6. The method of claim 1, wherein the first, second and third virtual machines are located in at least one of the virtualized radio units and are shared by the plurality of virtualized radio units.

7. The method of claim 1, wherein the first, second and third virtual machines are not remotely located from the radio units.

8. The method of claim 1, wherein the first and second virtualized radio units are located in a same radio base station node.

9. The method of claim 1, wherein the first and second virtualized radio units are located in different radio base station nodes.

10. A method for wireless communication, comprising:
transmitting a first uplink signal by a user equipment (UE) to a first virtualized radio unit during a first time interval, wherein the UE maintains connection with the first radio unit during the first time interval;
switching connection by the UE during a second time interval from the first virtualized radio unit to a second virtualized radio unit;
transmitting a second uplink signal by the UE to the second virtualized radio unit during the second time interval,
wherein the first and second uplink signals are processed by one or more virtual machines shared by both the first and second radio units, and
wherein a first virtual machine implements at least one of a lower physical layer (PHY-Low), an analog-to-digital converter (ADC), a digital-to-analog converter (DAC), and a radio frequency (RF) transceiver, and
wherein a second virtual machine implements at least one of a Radio Link Control (RLC) layer, a Medium Access Control (MAC) layer, and a higher physical (PHY-high) layer.

11. The method of claim 10, wherein the UE switches connection from the first virtualized radio unit to the second virtualized radio unit without a transfer of context information from the first virtualized radio unit to the second virtualized radio unit.

12. The method of claim 10, wherein a third virtual machine implements at least one of a Packet Data Convergence Protocol (PDCP) layer, a Service Data Adaptation Protocol (SDAP) layer, and a Radio Resource Control (RRC) layer.

13. The method of claim 10, wherein the UE switches connection from the first virtualized radio unit to the second virtualized radio unit when the UE changes location due to mobility.

14. The method of claim 10, wherein the UE switches connection from the first virtualized radio unit to the second virtualized radio unit due to changing channel conditions or loading in the network.

15. The method of claim 10, wherein the first, second and third virtual machines are located in at least one of the virtualized radio units and are shared by the plurality of virtualized radio units.

16. The method of claim 10, wherein the first and second virtualized radio units are located in a same radio base station node.

17. The method of claim 10, wherein the first and second virtualized radio units are located in different radio base station nodes.

18. The method of claim 10, wherein the first, second and third virtual machines are not remotely located from the virtualized radio units.

19. A method for wireless communication, comprising:
receiving a first downlink signal at a user equipment (UE), wherein the first downlink signal is transmitted by a first virtualized radio unit;
receiving a second downlink signal at the UE, wherein the second downlink signal is transmitted by a second virtualized radio unit,
wherein prior to transmission the first and second downlink signals are processed by one or more virtual machines shared by both the first and second radio units, and
wherein a first virtual machine implements at least one of a lower physical layer (PHY-Low), an analog-to-digital converter (ADC), a digital-to-analog converter (DAC), and a radio frequency (RF) transceiver, and
wherein a second virtual machine implements at least one of a Radio Link Control (RLC) layer, a Medium Access Control (MAC) layer, and a higher physical (PHY-high) layer,
wherein the UE switches connection from the first virtualized radio unit to the second virtualized radio unit without a transfer of context information from the first virtualized radio unit to the second virtualized radio unit.

20. The method of claim 19, wherein a third virtual machine implements at least one of a Packet Data Convergence Protocol (PDCP) layer, a Service Data Adaptation Protocol (SDAP) layer, and a Radio Resource Control (RRC) layer.

21. The method of claim 19, wherein the UE switches connection from the first virtualized radio unit to the second virtualized radio unit when the UE changes location due to mobility.

22. The method of claim 19, wherein the UE switches connection from the first virtual radio unit to the second virtual radio unit due to changing channel conditions or loading in the network.

23. The method of claim 19, wherein the first, second and third virtual machines are located in at least one of the virtualized radio units and are shared by the plurality of virtualized radio units.

24. The method of claim 19, wherein the first and second virtualized radio units are located in a same radio base station node.

25. The method of claim 19, wherein the first and second virtualized radio units are located in different radio base station nodes.

26. A method for wireless communication, comprising:
receiving a first downlink signal at a user equipment (UE) when the UE is at a first location, wherein the first downlink signal is transmitted by a first virtualized radio unit;
moving by the UE from the first location to a second location and switching connection from the first virtualized radio unit to a second virtualized radio unit;
receiving a second downlink signal at the UE, wherein the second downlink signal is transmitted by the second virtualized radio unit;
wherein prior to transmission the first and second downlink signals are processed by one or more virtual machines shared by both the first and second radio units, and
wherein a first virtual machine implements at least one of a lower physical layer (PHY-Low), an analog-to-digital converter (ADC), a digital-to-analog converter (DAC), and a radio frequency (RF) transceiver, and
wherein a second virtual machine implements at least one of a Radio Link Control (RLC) layer, a Medium Access Control (MAC) layer, and a higher physical (PHY-high) layer,
maintaining connection by the UE with the first virtual radio unit during a first time interval; and
switching connection by the UE during a second time interval from the first virtual radio unit to the second virtual radio unit.

27. The method of claim 26, wherein a third virtual machine implements at least one of a Packet Data Convergence Protocol (PDCP) layer, a Service Data Adaptation Protocol (SDAP) layer, and a Radio Resource Control (RRC) layer.

28. The method of claim 26, wherein the UE switches connection from the first virtualized radio unit to the second virtualized radio unit in response to moving from the first location to the second location.

29. A method for wireless communication, comprising:
transmitting at least first and second uplink signals by a user equipment (UE) to first and second virtualized radio units, respectively, wherein the first and second uplink signals are processed by one or more containers shared by both the first and second radio units, and
wherein a first container implements at least one of a lower physical layer (PHY-Low), an analog-to-digital converter (ADC), a digital-to-analog converter (DAC), and a radio frequency (RF) transceiver, and
wherein a second container implements at least one of a Radio Link Control (RLC) layer, a Medium Access Control (MAC) layer, and a higher physical (PHY-high) layer,
wherein the UE switches connection from the first virtualized radio unit to the second virtualized radio unit without a transfer of context information from the first virtualized radio unit to the second virtualized radio unit.

30. The method of claim 29, wherein a third container implements at least one of a Packet Data Convergence Protocol (PDCP) layer, a Service Data Adaptation Protocol (SDAP) layer, and a Radio Resource Control (RRC) layer.

31. A method for wireless communication, comprising:
receiving a first downlink signal at a user equipment (UE) during a first time interval,
wherein the first downlink signal is transmitted by a first virtualized radio unit;
receiving a second downlink signal at the UE during a second time interval, wherein the second downlink signal is transmitted by a second virtualized radio unit,
wherein prior to transmission the first and second downlink signals are processed by one or more containers shared by both the first and second radio units, and
wherein a first container implements at least one of a lower physical layer (PHY-Low), an analog-to-digital converter (ADC), a digital-to-analog converter (DAC), and a radio frequency (RF) transceiver, and
wherein a second container implements at least one of a Radio Link Control (RLC) layer, a Medium Access Control (MAC) layer, and a higher physical (PHY-high) layer,
wherein the UE switches connection from the first virtualized radio unit to the second virtualized radio unit without a transfer of context information from the first virtualized radio unit to the second virtualized radio unit.

32. The method of claim 31, wherein a third container implements at least one of a Packet Data Convergence Protocol (PDCP) layer, a Service Data Adaptation Protocol (SDAP) layer, and a Radio Resource Control (RRC) layer.

* * * * *